United States Patent [19]

Madnick et al.

[11] Patent Number: 5,617,081
[45] Date of Patent: Apr. 1, 1997

[54] METHOD AND APPARATUS FOR LIVE INSERTION AND REMOVAL OF ELECTRONIC SUB-ASSEMBLIES

[75] Inventors: Jay L. Madnick, Derry, N.H.; Stephen A. Hauser, Burlington, Mass.

[73] Assignee: 3COM Corporation, Santa Clara, Calif.

[21] Appl. No.: 398,112

[22] Filed: Mar. 3, 1995

Related U.S. Application Data

[62] Division of Ser. No. 191,391, Feb. 2, 1994, Pat. No. 5,584,030, which is a division of Ser. No. 738,581, Jul. 31, 1991, Pat. No. 5,317,697.

[51] Int. Cl.$^6$ ................................................ H04Q 1/00
[52] U.S. Cl. ............................ 340/825.03; 340/825.16
[58] Field of Search ............................ 340/825.03, 825.05, 340/825.16, 825.07, 825.5, 825.52, 825.08; 395/282, 283, 281, 183.08; 370/85.5, 85.1, 85.13, 85.14

[56] References Cited

U.S. PATENT DOCUMENTS

| | | | |
|---|---|---|---|
| 4,527,270 | 7/1985 | Sweeton | 371/11 |
| 4,775,864 | 10/1988 | Herman | 340/825.5 |
| 4,803,485 | 2/1989 | Rypinski | 340/825.05 |
| 4,835,737 | 5/1989 | Herrig et al. | 364/900 |
| 4,905,230 | 2/1990 | Madge et al. | 370/85.5 |
| 4,940,969 | 7/1990 | Taylor | 340/653 |
| 4,956,836 | 9/1990 | Boatwright | 370/16.1 |
| 4,999,787 | 3/1991 | McNally et al. | 364/514 |
| 5,000,531 | 3/1991 | Burberry | 350/96.16 |
| 5,115,235 | 5/1992 | Oliver | 340/825.52 |
| 5,157,771 | 10/1992 | Losi et al. | 395/325 |
| 5,210,855 | 5/1993 | Bartol | 395/500 |
| 5,274,800 | 12/1993 | Babb et al. | 395/183.08 |
| 5,287,531 | 2/1994 | Rogers, Jr. et al. | 395/800 |
| 5,317,697 | 5/1994 | Husak et al. | 395/283 |
| 5,408,616 | 4/1995 | Murr | 395/281 |
| 5,471,472 | 11/1995 | McClure et al. | 370/85.13 |

FOREIGN PATENT DOCUMENTS

| | | |
|---|---|---|
| 90280 | 5/1984 | Japan . |
| 139814 | 6/1986 | Japan . |
| 192814 | 8/1987 | Japan . |
| 251567 | 10/1989 | Japan . |
| 73589 | 3/1990 | Japan . |
| 164025 | 7/1991 | Japan . |

*Primary Examiner*—Edwin C. Holloway, III
*Attorney, Agent, or Firm*—Weingarten, Schurgin, Gagnebin & Hayes LLP

[57] ABSTRACT

A live insertion and removal mechanism assures that a sub-assembly being inserted or removed from a live electronic assembly does not disrupt system power and busses and is protected against the negative effects of current surge. Slot bypass circuitry is provided for effectively disconnecting selected output drivers from signal and control paths to avoid damage to the drivers upon insertion or removal of the sub-assembly from the live assembly.

3 Claims, 8 Drawing Sheets

(System Backplane)

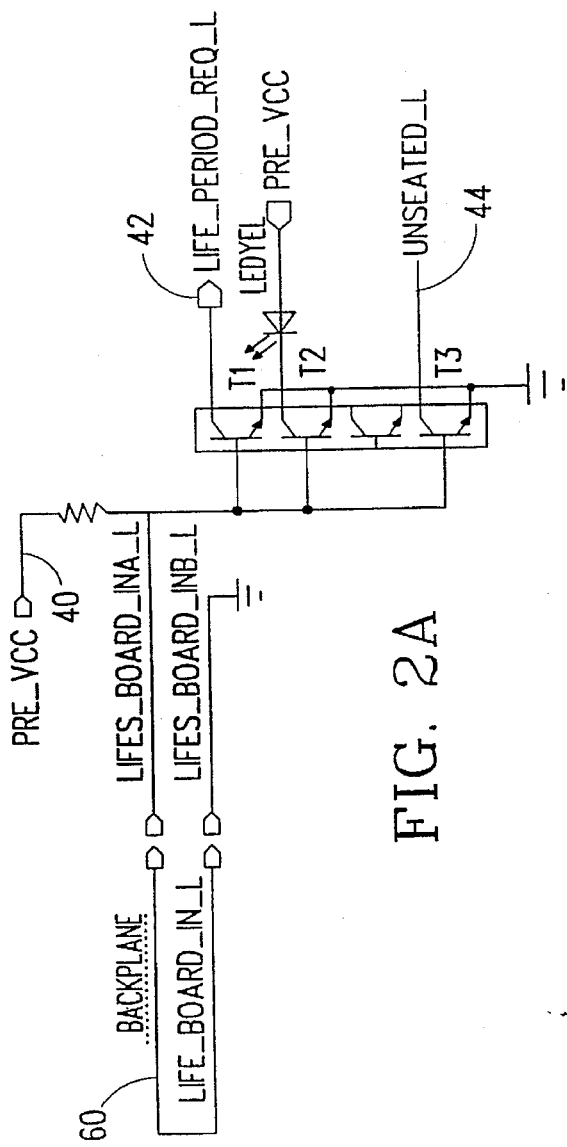
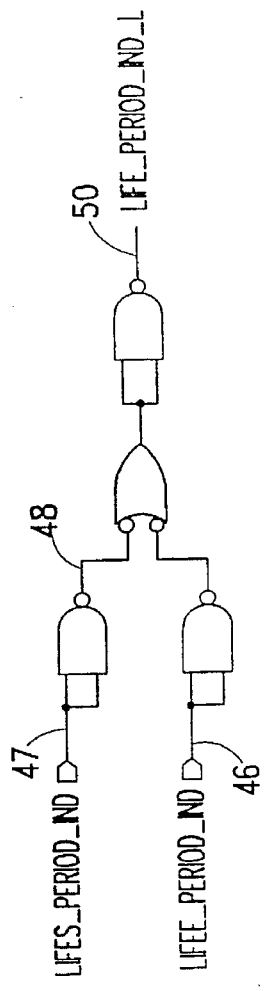
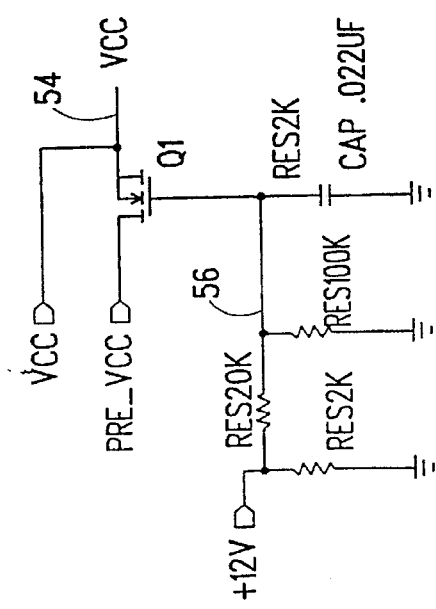
FIG. 2A
FIG. 2B
FIG. 2C

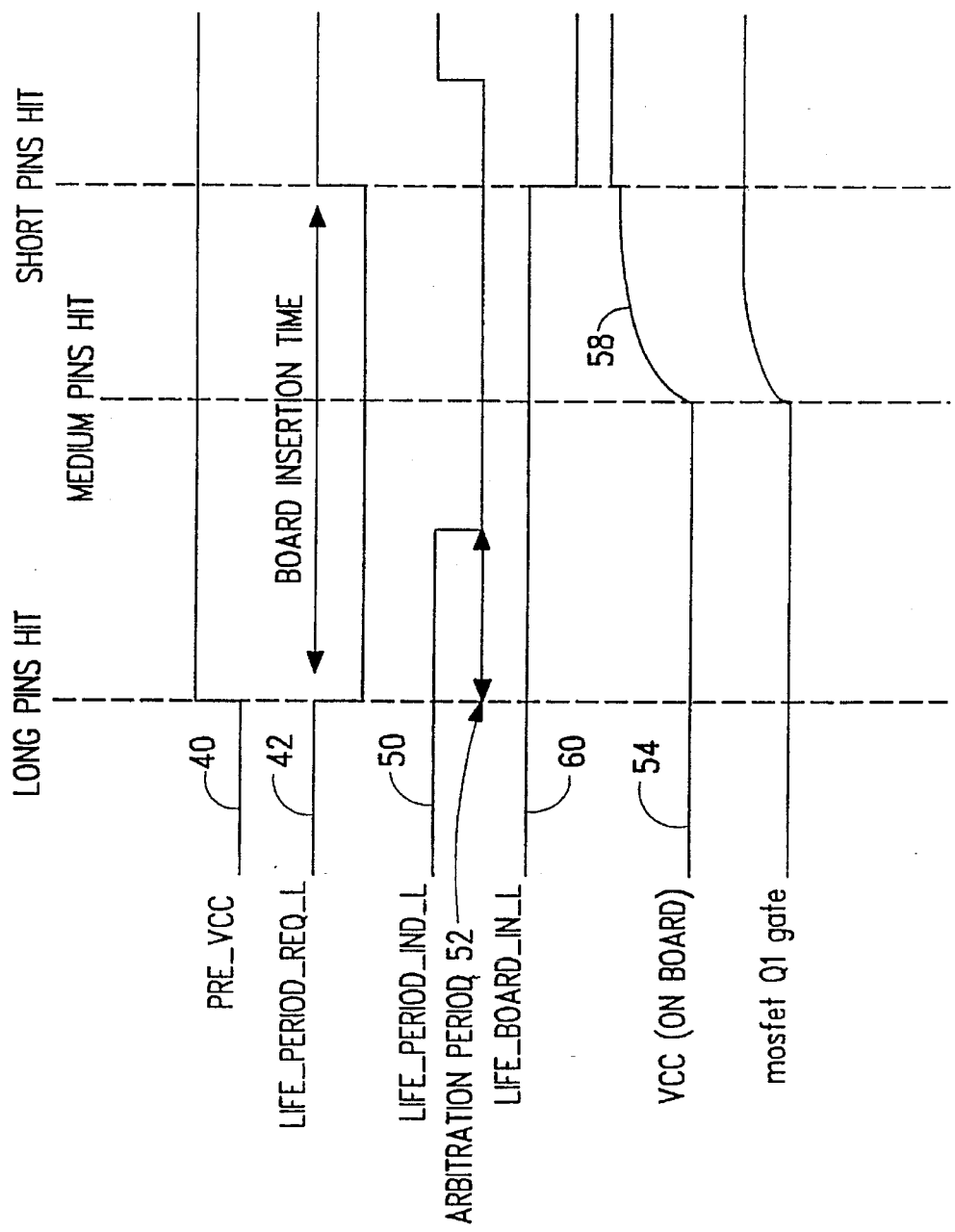
FIG. 3A (Live Insertion)

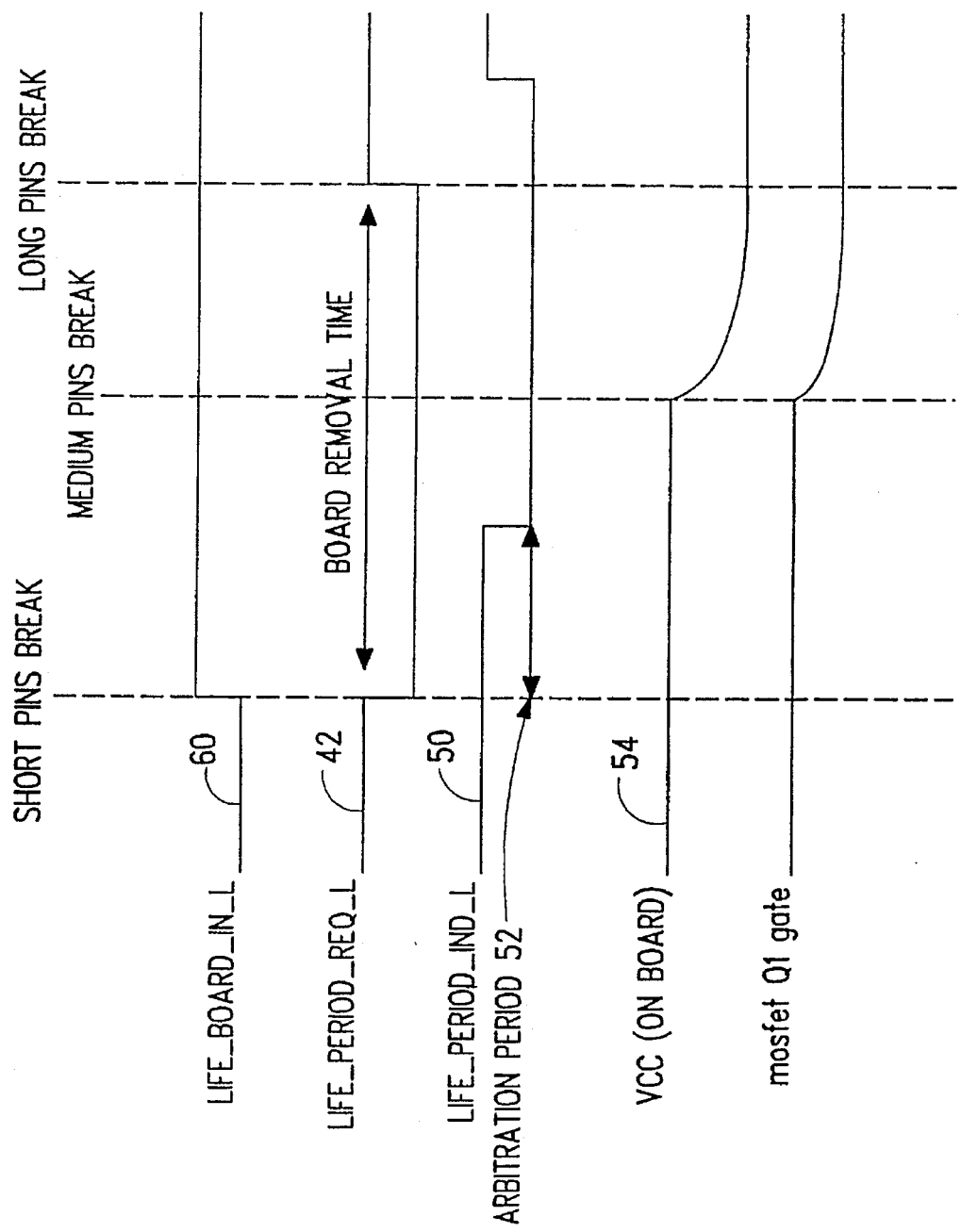
FIG. 3B (Live Removal)

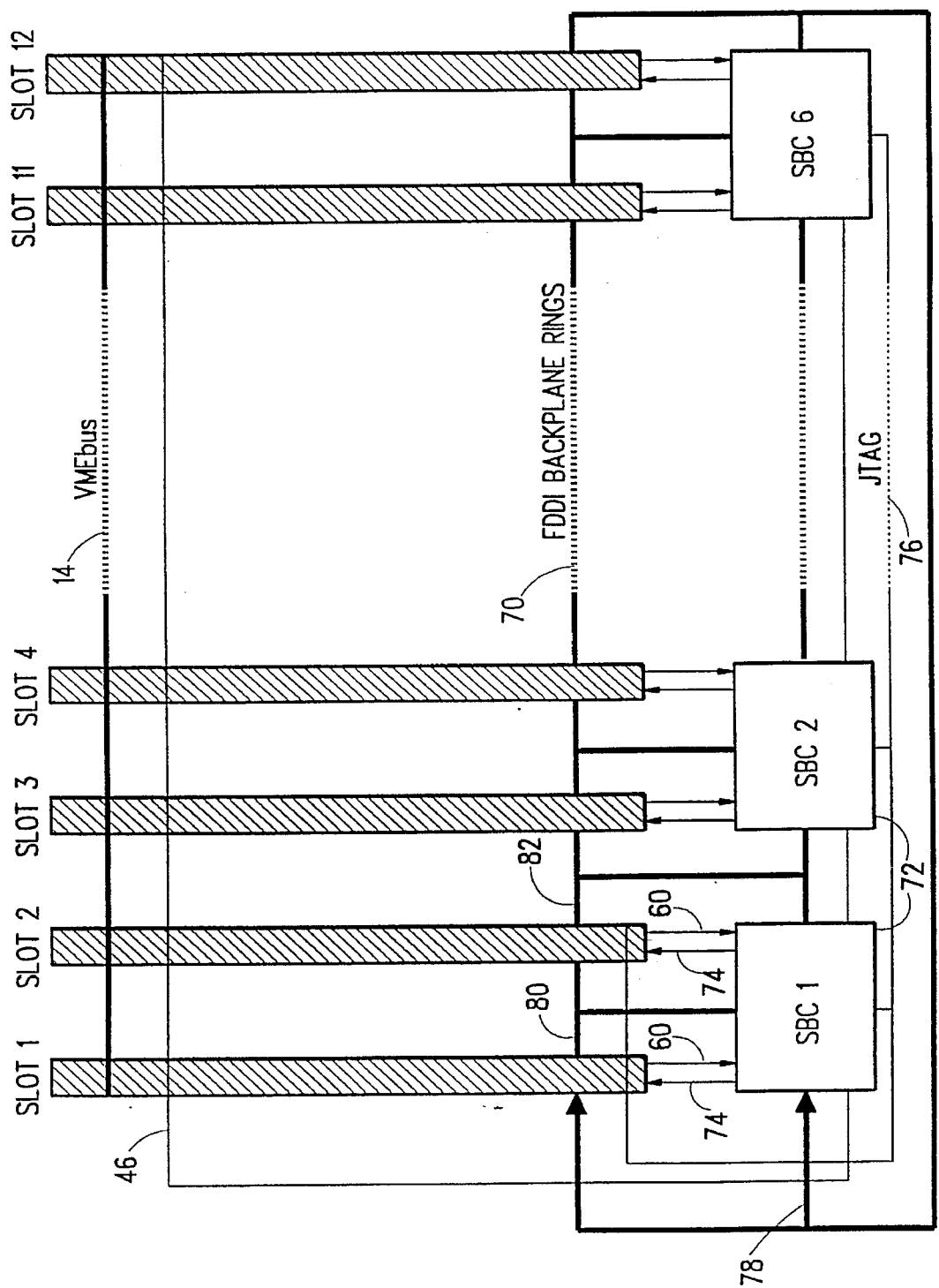
FIG. 4 (System Backplane)

METHOD AND APPARATUS FOR LIVE INSERTION AND REMOVAL OF ELECTRONIC SUB-ASSEMBLIES

RELATED APPLICATIONS

This application is a division of U.S. patent application Ser. No. 08/191,391, filed Feb. 2, 1994, allowed U.S. Pat. No. 5,584,030 entitled: METHOD AND APPARATUS FOR LIVE INSERTION AND REMOVAL OF ELECTRONIC SUB-ASSEMBLIES, which is a divisional of Ser. No. 738,5581 filed Jul. 31, 1991 now U.S. Pat. No. 5,317,697, issued May 31, 1994, entitled: METHOD AND APPARATUS FOR LIVE INSERTION AND REMOVAL OF ELECTRONIC SUB-ASSEMBLIES.

FIELD OF THE INVENTION

The present invention relates to installing and removing electronic sub-assemblies and in particular to insertion and removal of electronic sub-assemblies into and out of a live or powered-up electronic assembly.

BACKGROUND ART

A need for electronic systems with one hundred percent on-line performance, translates into a need for live insertion and removal capabilities in electronic assemblies and/or sub-assemblies. Electronic assemblies, such as in communication network controllers, servers, gateways, routers and the like, which need to be on-line continuously require the ability to have sub-assemblies inserted and removed from the system without having to power the system down, install or remove the sub-assembly, re-apply power and re-initialize the system.

Several criticalities need to be considered in implementing a scheme to enable insertion and removal of sub-assemblies from a live (powered-up) electronic assembly. The sub-assembly which is unpowered and being inserted into the live assembly will, initially, draw considerable amounts of current from the power system supplying the live assembly. Similarly, a sub-assembly being removed from the live assembly may considerably decrease a load seen by the power system. Thus, there is a need to provide a means for assuring that the sub-assembly being inserted or removed from the powered assembly does not significantly disturb a system's power source. Further, when a sub-assembly is withdrawn under powered-up conditions current continues flowing across gaps created between assembly and sub-assembly contact points, which creates arcing. Such arcing causes deterioration of contact surface coatings and can damage the contact surfaces.

In systems that have parallel or serial data paths and associated control signals, consideration must also be given with respect to signal paths and buses. An unpowered, uninitialized sub-assembly contacting a powered bus can corrupt signals on the powered-up paths. When bus cycles are lost because data or control signal integrity is not maintained, it is extremely difficult to recreate the lost bus cycles. Thus, it is desirable to preclude the loss of bus cycles caused by insertion or removal of a sub-assembly.

An additional consideration that arises when insertion or removal of a sub-assembly to or from a powered assembly is desirable, is protection of the circuitry on the sub-assembly being inserted or removed. Many integrated circuits are fabricated such that there is a low impedance path between a circuit output and Vcc in a back biased direction. When such a circuit is present on a sub-assembly that is inserted into a live assembly, current from the live assembly, seeking the path of least resistance, will surge through the low impedance path possibly destroying the device. Some integrated circuit manufacturers put a diode in the low impedance path in certain logic families. However, often these diodes are not tested and one cannot be certain of their presence or functionality.

The aforementioned considerations are presently addressed in part by some implementations of live-insertion schemes known in the art. One implementation known, is to use DC-DC conversion schemes wherein a backplane is provided with a backplane voltage at a higher voltage than is used by the sub-assemblies. Each sub-assembly has a DC-DC converter for connection to the backplane voltage, to effect power isolation. Such an implementation requires significant additional and costly circuitry and consumes considerable space on the sub-assemblies.

An alternative scheme using a mechanical switch to remove and supply power to a sub-assembly being removed or inserted, is disclosed in U.S. Pat. No. 4,835,737. The modules to be live inserted or removed each have an associated mechanical switch that causes an inhibit signal to be issued to a control circuit which has a resident state machine to effect a logic sequence that inhibits bus operation, such as by halting clock signals. Two different lengths of pins are used in a connector to which the actuator operated switch is connected to assure that the switch state indicating pins contact the connector before other signal pins. However, in such an embodiment no attempt is made to protect voltages on the backplane or to protect devices on the sub-assembly being inserted or removed. Further, such a live insertion mechanism requires elaborate sequential logic circuitry.

SUMMARY OF THE INVENTION

The present invention provides a live insertion and removal mechanism that does not require the use of elaborate sequential logic circuitry in assuring that a sub-assembly being inserted or removed from a live electronic assembly does not disrupt system power and corrupt system buses. In addition, the mechanism protects the sub-assembly being inserted or removed against damage.

As presently disclosed, an active switching device such as a metal oxide semiconductor field effect transistor (mosfet) and related massive circuitry, and a connector having a plurality of graduated pin lengths effect a controlled ramp-up and ramp-down of power to a sub-assembly inserted into and removed from a live electronic assembly. During insertion of an unpowered sub-assembly into a live electronic assembly, a first set of contact pins (long pins) provide a ground and a preliminary voltage (PRE_VCC) to the inserted sub-assembly to power live insertion request logic. A live insertion period request is issued which causes a system bus arbiter to force the system bus to an idle state after any bus operation in progress is completed. A second set of contact pins (medium pins) provide power to the mosfet and related passive circuitry which ramps up power to the inserted sub-assembly assuring that current in-rush is gradual. A third set of contact pins (short pins) bypass the mosfet circuitry and indicate when the sub-assembly is fully inserted. During removal short pins disengage first. The mosfet bypass is removed. An indication is issued that the sub-assembly is not fully seated. A live insertion period is requested. The mosfet and related passive circuitry ramp down power after the medium pins disengage until the power to the sub-assembly is completely removed upon full withdrawal.

Features of the invention include using system voltages used on a backplane for assembly and sub-assembly power, to implement protection schemes as described. This inexpensive implementation of live insertion and removal avoids complex circuitry and the consumption of valuable board space associated therewith. Critical pins are strategically located the connector to avoid problems resulting from board or assembly skew during insertion or removal.

DESCRIPTION OF THE DRAWING

The invention will be more fully understood from the following detailed description taken in conjunction with the accompanying drawing in which:

FIG. 2a is a schematic diagram of live insertion request logic;

FIG. 2b is a schematic diagram of a mosfet and related passive circuitry for power ramp-up and ramp-down;

FIG. 2c is a schematic diagram of local live insertion indication circuitry;

FIG. 3a is a timing diagram illustrating signal relationships during a live insertion;

FIG. 3b is a timing diagram illustrating signal relationships during a live removal;

FIG. 4 is a block diagram of a communication system having a VMEbus and FDDI backplane ring with automatic ring healing.

DETAILED DESCRIPTION

Figure 1:
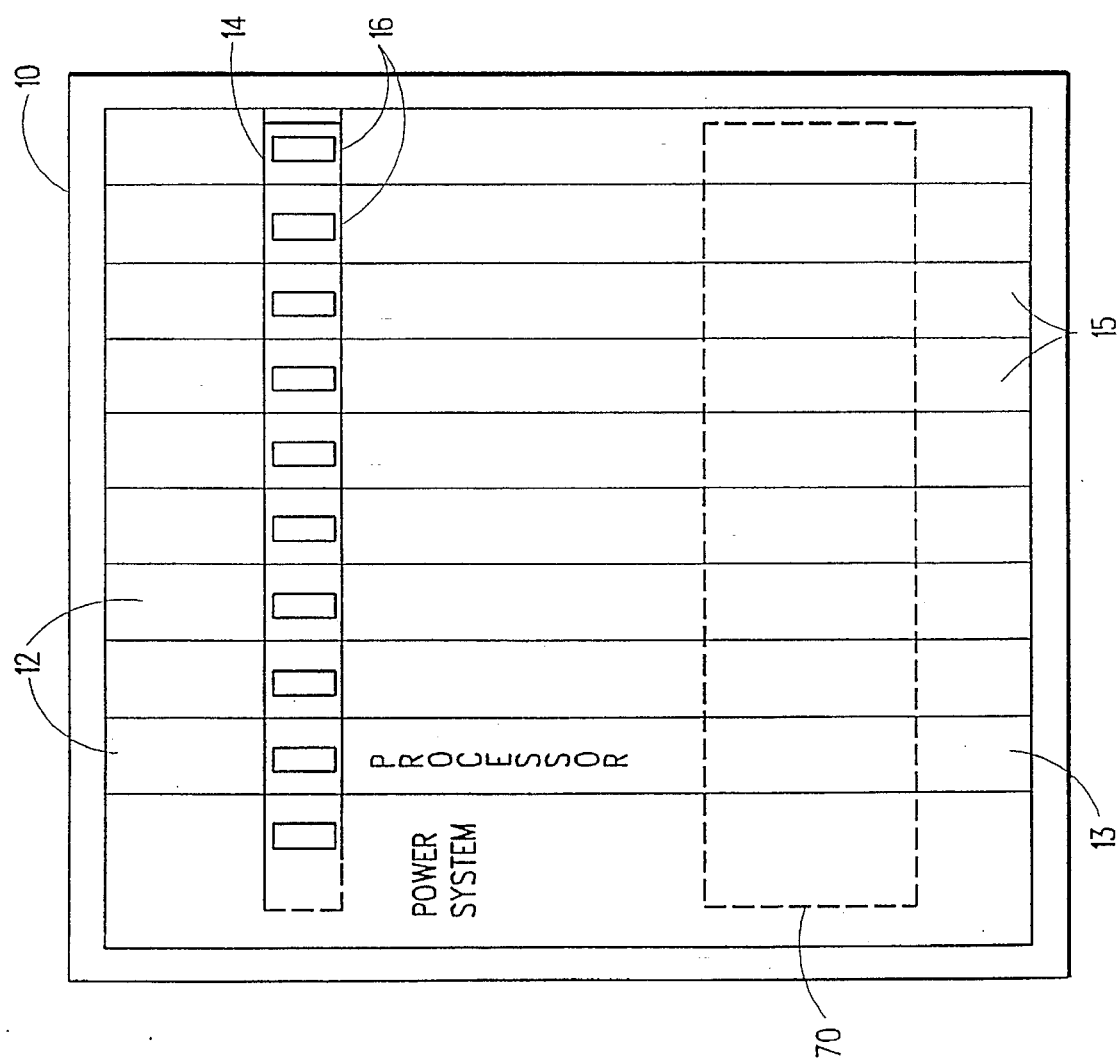
FIG. 1 is a diagrammatic view of a communication system.
Figure 1A:
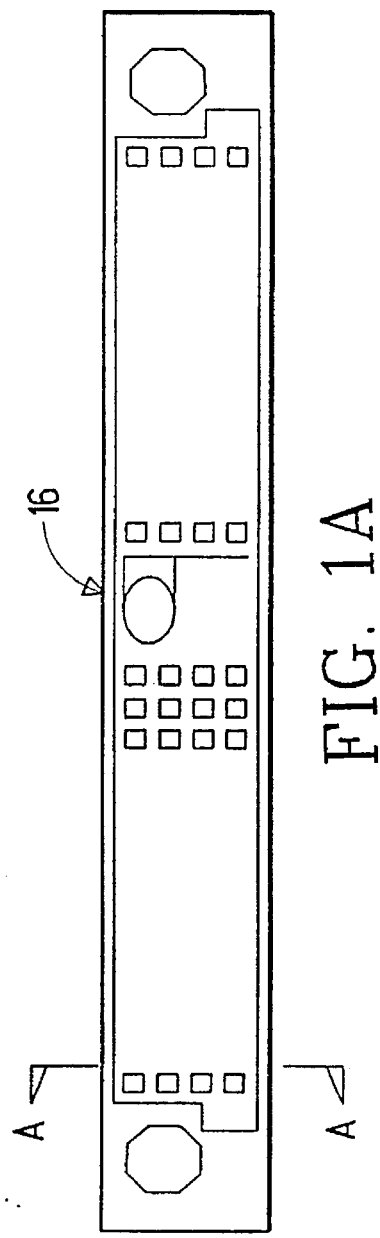
FIG. 1a is a plan view of a connector having variable length pins.
Figure 1B:
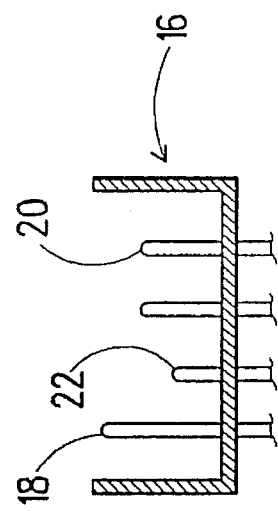
FIG. 1b is a side sectional view of the connector of FIG. 1a taken alone a line A—A.

An illustrative embodiment of a live insertion and removal mechanism according to the invention can be implemented in a communication apparatus, such as a network hub as illustrated in FIG. 1 and described in co-pending commonly owned U.S. Pat. No. 5,471,472 which is incorporated herein by reference. Such a system typically comprises a chassis 10 having a backplane 12 which defines slots for accommodating a plurality of sub-assemblies or circuit boards 15. The backplane provides pathways, such as power planes and buses for conveying power, control and data signals among a processor 13 and circuit boards installed in the system. The circuit boards access the backplane for communication over a bus, such as a VMEbus 14, via a plurality of connectors 16.

Where there are large amounts of power, control and data signals to be transmitted on the bus, the connectors may be high density interconnect devices, such as illustrated in FIGS. 1a and 1b. The connectors according to this illustrative embodiment comprise a four row vertical header with compliant pressfit pins and a guide pin for assuring proper alignment with a mating receptacle.

To effect live insertion and removal according to the invention, a plurality of pin heights is desirable to create sequenced engagement or contact of electronic circuitry as discussed hereinafter. In the case of insertion, a first pin height or long pin(s) 18 facilitate an initial electrical connection between the connector 16 and receptacle. A second pin height or medium pin(s) 20 facilitate an intermediate engagement and a third pin height or short pin(s) 22 are the last pins to engage for complete electrical connection. The difference in height between the respective heights is preferrably approximately 0.03 inch.

Upon removal, the sequence of disengagement is reversed. The short pins 22 disengage first the medium pins 20 disengage second and the long pins 18 are last to disengage. The sequence of disengagement facilitates graceful removal of power.

Figure 2:
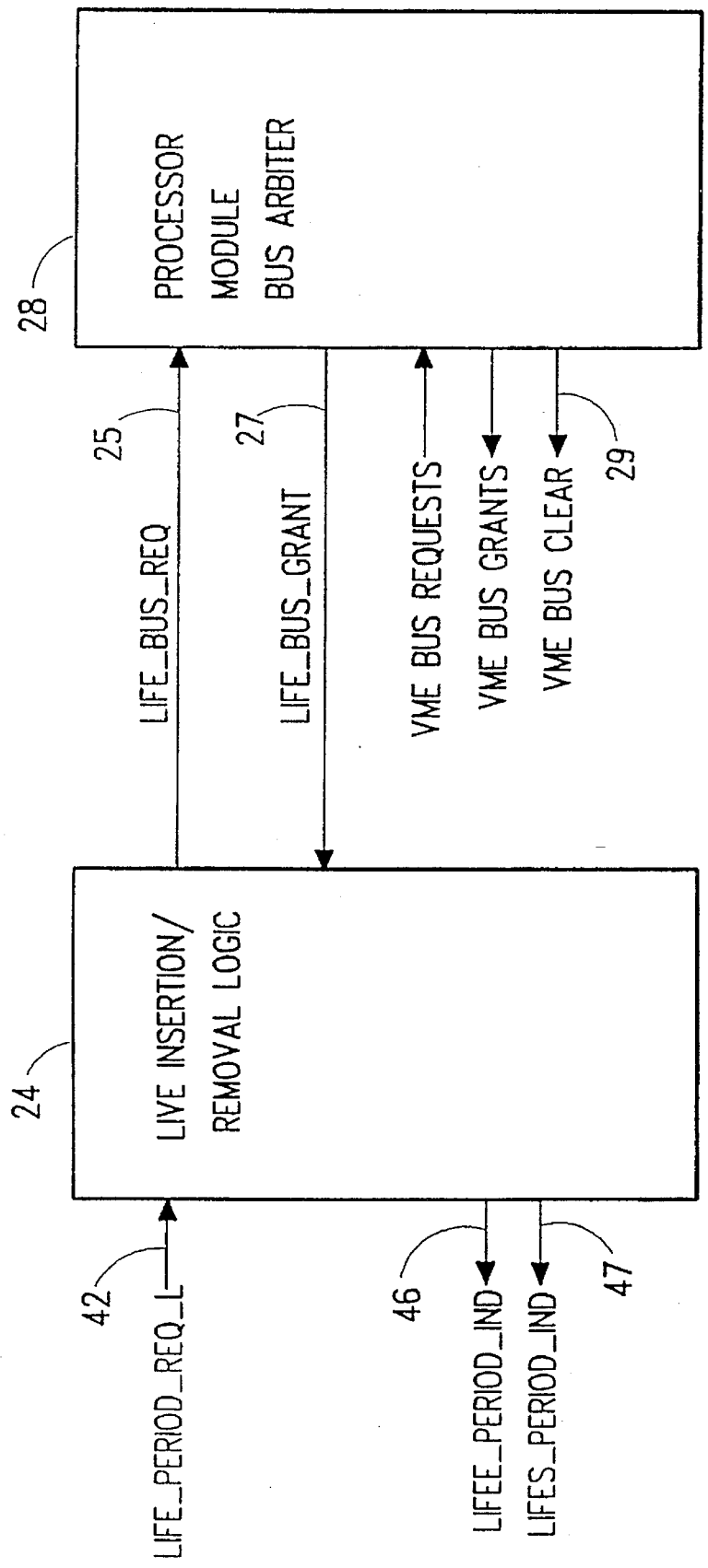
FIG. 2 is a block diagram of electronic circuitry for implementing live insertion.

The plurality of pin heights as described hereinbefore work in conjunction with electronic circuitry to effect live insertion and removal, without damage to any electronic circuitry and without corruption of data. As illustrated in the block diagram of FIG. 2, insertion/removal logic 24 is required to sense or detect when a live insertion or removal is being undertaken, as indicated by circuitry on a sub-assembly being installed or removed. The insertion/removal logic 24 is resident on the processor board 13. The insertion/removal logic 24 communicates with bus arbitration logic 28 resident on the processor board 13. The bus arbitration logic, such as a VME bus arbiter known in the art, receives bus requests and prioritizes bus access. The known bus arbitration logic 28 is modified to accommodate a highest priority bus request which is issued by the insertion/removal logic 24 as discussed hereinafter.

Referring now to FIGS. 2, 2a–2c and 3a, circuitry resident on the sub-assembly being inserted initiates signals which alert the insertion/removal logic 24 to a live insertion. Upon live insertion of a sub-assembly into the system, the long pins 18 make contact first and provide a reference or ground and a PRE_VCC voltage of 5 volts. The PRE_VCC 40 voltage biases a transistor T1 to issue an active low signal, LIFE_PERIOD_REQ_L 42, which indicates that a live insertion is taking place. Preferrably, there are two LIFE_PERIOD_REQ_L signals, one at either end of the connector or board, to assure issuance of the signal regardless of board skew or angle of insertion. The signals are appropriately terminated on the backplane and received by the insertion/removal logic 24 via schmidt trigger input and debounce circuitry (not shown) to account for any physical jitter during insertion. The signals are asserted from the time the long pins 18 contact until the short pins 22 contact and the board is fully seated.

The initial contact of the long pins 18 also biases open collector transistors T2 and T3, which illuminate an LED to indicate a live insertion period and issue an active low signal UNSEATED_L 44, to indicate the sub-assembly is not yet seated, respectively.

when LIFE_PERIOD_REQ_L 42 is received by the processor resident insertion/removal logic 24 (FIG. 2), it issues a bus request having the highest priority, LIFE_BUS_REQ 25, to the processor module bus arbiter 28, which has been modified to receive such a highest priority bus request in addition to the bus requests normally processed as known in the art.

Upon receipt of LIFE_BUS_REQ 25 the bus arbiter 28 issues VME Bus Clear 29 to tell currently active bus masters to complete their bus cycles and relinquish the bus. Once the bus is relinquished the arbiter 28 issues LIFE_BUS_

GRANT 27 to the insertion/removal logic 24. The insertion/removal logic 24 will wait for the current bus cycle to complete and then issue LIFEE_PERIOD_IND 46 and LIFES_PERIOD_IND 47 as a long pin signal and short pin signal, respectively. Sub-assemblies or modules should be designed to guarantee that they relinquish the bus and complete their last bus cycles so that LIFEE_PERIOD_IND 46 and LIFES_PERIOD_IND 47 can be asserted prior to the medium length connector pins making contact. In the event that a sub-assembly does not relinquish the bus within a described time interval, the insertion/removal logic 24 will assert LIFEE_PERIOD_IND 46 and LIFES_PERIOD_IND 47, regardless of the arbiter state. This is done to guarantee that these LIFE_PERIOD_IND signals are always asserted prior to the medium length connector pins making contact. This ensures that sub-assembly component damage will not occur, even in a case where the bus is not properly relinquished. This may cause the current bus cycle to be corrupted, which necessitates system error recovery.

Preferably, the LIFE_PERIOD_IND signals are received by the sub-assemblies on the bus via two connector pins, a long pin and a short pin to maintain the integrity of the signal during insertion or removal and assure that glitching cannot happen to both signals at the same time. The LIFEE_PER_IND 46 and LIFES_PERIOD_IND 47 signals must be driven by separate drivers on the processor since tying them together would defeat the purpose of having two pins to protect against glitches.

Each sub-assembly has circuitry 48, as illustrated in FIG. 2c, to logically OR the LIFEE_PER_IND 46 and LIEES_PERIOD_IND 47 signals together to form a single LIFE_PERIOD_IND_L signal 50. The LIFE_PERIOD_IND_L signal 50 prevents sub-assemblies on the bus from driving it or using it in any manner. All data, address and control signals are forced to an undriven condition when this signal is asserted. Thus, there will be no attempts to communicate over the bus and no significant signals, other than a system reset, will be communicated during the ensuing live insertion or removal period. Guaranteeing that the bus is undriven during sub-assembly insertion/removal, as described hereinabove, prevents bus cycles from being corrupted. It also protects circuitry on the sub-assembly from being damaged.

In order to substantially prevent disruption to system power, a mosfet circuit is provided. This circuit, illustrated in FIG. 2b, ramps voltage to the sub-assembly up on insertion and down on removal. A +12 volt signal is applied by a medium length pin to an RC time constant circuit 56 of the mosfet Q1. In the case of sub-assembly insertion, the mosfet Q1 and associated passive components buffer VCC 54 to assure that current in-rush is gradual to protect the sub-assembly circuitry and minimize impact on the power system. A voltage divider and RC time constant circuitry 56 determine the ramp-up time and ultimate level of the buffered VCC. The VCC 54 signal, subject to internal resistance of the mosfet which limits current during ramp-up 58, reaches a level of approximately 4.8 volts.

Shortly thereafter, short pins 22 make contact and the sub-assembly or board is fully seated. The short pins 22, include Vcc pins which bypass the mosfet Q1 current limiting circuit. The mosfet Q1 internal resistance is bypassed when the VCC on short pins 22 makes contact. At this point the board voltage, VCC, reaches its maximum potential of +5 volts as shown in FIG. 3a. One of two short pins, preferably located at opposing ends of the connector and designated LIFES_BOARD_INA_L and LIFES_BOARD_INB_L, is connected to ground on the sub-assembly inserted. The signals are connected together on the backplane and in combination result in a signal illustrated as LIFE_BOARD_IN_L 60, shown in FIG. 3a. When the LIFE_BOARD_IN_L 60 signal issues upon the two LIFES_BOARD_IN_L signals being connected, the board is fully seated. The transistor T1 is turned off and the signal LIFE_PERIOD_REQ_L 42 is deasserted. Upon recognizing LIFE_PERIOD_REQ_L 42 is deasserted, the insertion/removal logic 24 deasserts the LIFE_PERIOD_IND signals and LIFE_BUS_REQ 25, and the live insertion is complete.

When a sub-assembly is removed from a live assembly or system, a process in reverse of that described hereinbefore effectively takes place. Referring now to FIGS. 2, 2a–2c and 3b, when either of the short pins generating LIFES_BOARD_IN_L break contact, the ground pulling down and asserting LIFES_BOARD_INA_L is lost and consequently LIFE_PERIOD_REQ_L 42 is asserted via transistor T1 of FIG. 2a. At this point operation of the insertion/removal logic 24 and arbiter 28 is substantially as described hereinbefore with respect to insertion. Sub-assembly removal is complete when the LIFE_PERIOD_REQ_L 42 signal or PRE_VCC 40 break contact, whichever is first.

The mosfet Q1 also operates substantially in reverse on board removal. The mosfet Q1 and passive circuitry 56 is activated when the short Vcc pins break contact. At this point, all power to the sub-assembly is flowing through the mosfet. After the medium length +12 volt pin breaks contact the voltage VCC 54 is ramped down slowly. This prevents disturbance to the backplane power and also prevents arcing of power pins. After sub-assembly power is fully ramped down, the long pins break contact and the sub-assembly is fully removed.

Figure 5:
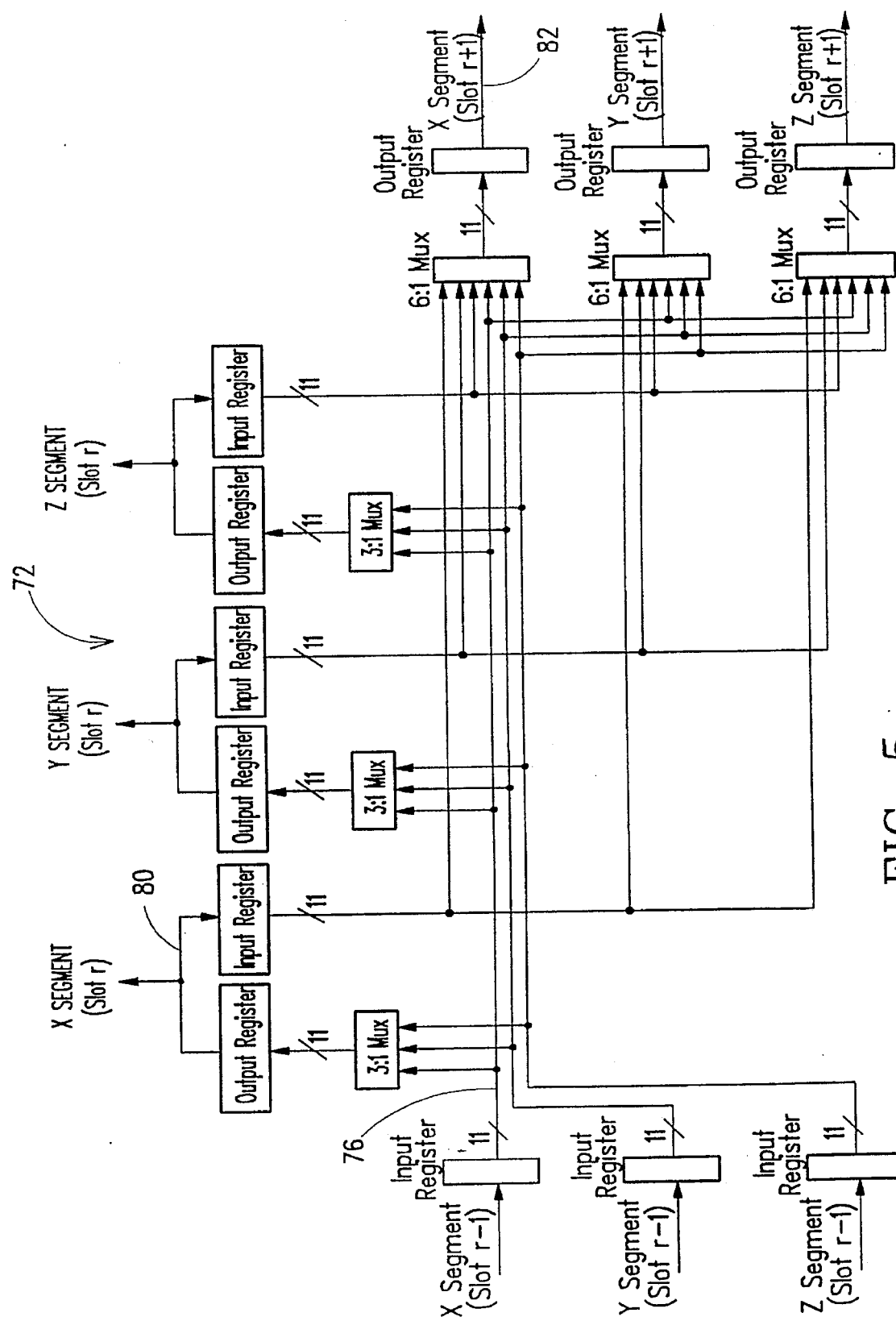
FIG. 5 is a block diagram of a slot bypass chip used in the ring healing implementation of FIG. 4.

Referring now to FIGS. 1, 4 and 5, the live insertion and removal mechanism presently disclosed can also be used to invoke ring healing in the communication hub that has an integral ring, such as an FDDI backplane ring. The backplane ring circuitry may also be protected by the sequenced pin contacting of the varied length pins.

An FDDI ring 70 as illustrated in FIG. 4, requires an ability to "heal" when a sub-assembly is withdrawn from the system leaving an open slot in the backplane. Although the loss of packet transmissions is not fatal, because protocols re-transmit lost packets, there is a need to bypass empty slots in order to maintain ring integrity. Slot bypass circuitry 72 (SBC), which may be integrated as a CMOS application specific integrated circuit or in any other form, can be used one per slot or one per multiple slots to initiate healing or to automatically heal the ring 70 subsequent to receiving signals indicating that a live insertion or removal, respectively, has occurred in the system.

The FDDI ring 70, or a plurality thereof, may be a byte wide data path with three control signals received by sub-assemblies disposed in slots 15 in the backplane, as discussed in the referenced application. The SBC 72, or a plurality thereof, may be disposed on the backplane and configured so that when a sub-assembly is present, such as a system processor in slot1, information on the FDDI ring 70 is received by the sub-assembly and passed along the ring 70 as designated, until a slot having no sub-assembly present, such as empty slot2 is encountered, at which point the SBC will intervene.

Transmissions received by a sub-assembly in an occupied slot, slot1, may be passed along the ring 70 to other sub-assemblies in the system. If slot1 is empty, the SBC 72, sensing LIFE_BOARD_IN_L 60 deasserted receives the transmission on an input bus 78, one of three, having the same byte width and control signal components as the FDDI backplane ring 70. The SBC 72 bypasses the empty slot1 by routing the transmission to an intermediate bi-directional bus 80. The bi-directional bus 80 is electrically connected to the ring 70 intermediate to slot1 and slot2. With slot1 empty, the bi-directional bus 80 may act to route the transmission around the empty slot1 and to the ring input to slot2 (assuming that slot2 is not empty).

If slot2 is empty, and slot1 occupied, the SBC 72 routes the transmission via the intermediate bi-directional bus 80 from the outputs of the slot1 sub-assembly to the SBC 72. The SBC 72 receives the transmission and routes it back to the ring 70 via a unidirectional bus 82.

The SBCs can also be designed to interface to the VME bus and to effect a daisy chain bypass of the empty slot, for the appropriate diasy chain signals.

The SBC is in communication with its respective slots via various control signals. In the present embodiment various control signals 74 (shown as a single line in FIG. 4) from the SBC provide enables to a respective slot to permit bus transmissions on the VME bus and the FDDI ring if a sub-assembly is present therein to facilitate the transmission. Further, the enables will permit disabling of a sub-assembly present in a particular slot, by effectively turning the board off by causing tri-stating of the boards output drivers.

Several live insertion control signals are received by the SBCs. The SBCs receive the LIFE_PERIOD_IND signals, which come from the insertion/removal logic 24, as discussed hereinbefore. The LIFE_PERIOD_IND signals as with the sub-assemblies in the slots, tri-state outputs of the SBCs 72 on the ring 70. The SBCs are put in a condition so as to make no further transmissions on the ring and to ignore any signals on the ring. When a sub-assembly being inserted is fully seated, the short pins 22 making contact facilitate delivery of the LIFE_BOARD_IN_L signal 60 to the SBCs 72, which ends the live insertion period when the LIFE_PERIOD_IND signals are deasserted, the SBCs return to the condition they were in prior to the live insertion. Typically, this will cause the SBCs to re-establish the ring. At that point, it is preferable to defer to a processor invoked diagnostic routine to test the inserted sub-assemblies' ring interface and related circuitry prior to permitting any ring communication to and from the newly inserted module.

As with the VME bus implementation, generally the reverse situation occurs relative to the ring when a sub-assembly is withdrawn therefrom. The long pins 18 break contact initially and remove the LIFE_BOARD_IN_L signal 60. That results in the assertion of LIFE_PERIOD_REQ_L 42 signal which eventually causes the LIFE_PERIOD_IND signals to be asserted.

When the sub-assembly is fully disengaged from the system, it is preferable to have the SBCs automatically heal the ring rather than deferring to the processor. The SBCs heal the ring by rerouting transmissions, as discussed hereinbefore, to bypass the empty slot. As illustrated in FIGS. 4 and 5, the SBCs are effectively bypass switches that effect selectable rerouting over available buses. In the present embodiment, while only one ring is discussed it may be desirable to have a plurality of backplane rings, such as three as illustrated in FIG. 5, handled by the SBCs. Additionally, it may be preferable to have each SBC facilitate rerouting for a plurality of slots, such as two.

The processor controls the SBCs through an IEEE standard 1149.1 "JTAG" interface 76, known in the art, having four signal lines, namely data-in, data-out, clock and mode select. The JTAG bus permits controlling and testing of the SBCs. It will be appreciated that the various pathways selectably configurable within the SBC as described and illustrated hereinbefore, can be controlled by the JTAG bus as known in the art, to perform such functions as "twisting the ring" or bypassing selected ring segments.

While the SBCs are described hereinabove as comprising three ring facilities and providing bypass services for two slots, it can be appreciated by one of ordinary skill in the art that SBCs can be implemented to provide single or plural bypass services or to accommodate a different number of backplane rings.

The live insertion and removal mechanism is described herein in the context of a VMEbus and an FDDI backplane ring, however those of ordinary skill in the art will appreciate that such a mechanism can be implemented in systems having other system buses.

Similarly, while the invention is discussed in the context of a communication hub, it will be appreciated that such a live insertion and removal mechanism can be desirably implemented in other contexts wherein sub-assemblies are inserted or removed from a live assembly, such as in computer systems and the like.

Although the invention is described as using sub-assembly resident transistor circuits and mosfet, it can be appreciated that other active switching devices such as e.g. bipolar transistors, Field Effect transistors, and time delay circuitry can be used, and could be backplane resident or located on other circuit boards.

while three pin heights, differing by 0.03 inch are used herein to illustrate the live insertion and removal according to the invention, it will be appreciated that greater or fewer heights, of various differentials can be implemented.

Although the invention has been shown and described with respect to an exemplary embodiment thereof, it should be understood by those skilled in the art that the foregoing and various other changes, omissions, and additions in the form and detail thereof maybe made therein without departing from the spirit and scope of the invention.

What is claimed is:

1. Method for routing selected signals among sub-assembly slots and around at least one unused slot in a backplane in an electronic assembly having at least two slots, said method comprising the steps of:

establishing a first communication path between a first slot input path and a bypass circuit;

establishing a second communication path between a second slot output path and said bypass circuit;

establishing a third communication path between a first slot output path, a second slot input path and said bypass circuit;

sensing a first control signal indicative of the presence of a first sub-assembly in a first slot;

sensing a second control signal indicative of the presence of a second sub-assembly in a second slot; and receiving selected signals at said first slot input path and routing said selected signals to one of said first slot output path and said bypass circuit in accordance with said first control signal, said selected signals routed to said bypass circuit being routed therethrough around said first slot via said third communication path to said second slot input path.

2. The method claim 1 further comprising the steps of:

receiving selected signals at said second slot input path and routing said selected signals to one of said second slot output path and said bypass circuit in accordance with said second control signal, said selected signals routed to said bypass circuit being routed therethrough around said second slot via said third communication path to said second slot output path.

3. The method of claim 1 wherein said step of establishing a third communication path between a first slot output path, a second slot input path and said bypass circuit comprises establishing a bidirectional communication path between said bypass circuit and at least one of said first slot output path and said second slot input path.

* * * * *

UNITED STATES PATENT AND TRADEMARK OFFICE
CERTIFICATE OF CORRECTION

PATENT NO. : 5,617,081
DATED : April 1, 1997
INVENTOR(S) : Jay L. Madnick, et al.

It is certified that error appears in the above-indentified patent and that said Letters Patent is hereby corrected as shown below:

Column 2, line 48, "massive" should read --passive--.

Column 4, line 13, "first the" should read --first, the--.

Column 4, line 56, "when" should read --When--.

Column 5, line 30, "LIEES_" should read --LIFES_--.

Column 8, line 30, "while" should read --While--.

Signed and Sealed this

Fourteenth Day of April, 1998

Attest:

BRUCE LEHMAN

Attesting Officer     Commissioner of Patents and Trademarks